(No Model.)

J. H. WARD.
POWER TRANSMITTING AND STOPPING DEVICE.

No. 493,457. Patented Mar. 14, 1893.

Witnesses
Geo W. Young,
Hattie Tallmadge

Inventor
John H. Ward
By Benedict & Morsell
Attorney

United States Patent Office.

JOHN H. WARD, OF WHITEWATER, WISCONSIN.

POWER TRANSMITTING AND STOPPING DEVICE.

SPECIFICATION forming part of Letters Patent No. 493,457, dated March 14, 1893.

Application filed August 11, 1892. Serial No. 442,839. (No model.)

*To all whom it may concern:*

Be it known that I, JOHN H. WARD, of Whitewater, in the county of Walworth and State of Wisconsin, have invented a new and useful Improvement in Power Transmitting and Stopping Devices, of which the following is a description, reference being had to the accompanying drawings, which are a part of this specification.

The device in which my invention is embodied is adapted especially for use on farms where a power operated by animals or by steam is used, for general purposes, located near the buildings, when such power is desired to be used for pumping water or other kindred purposes, at some place at a distance from the location of the power supply.

Figure 1:
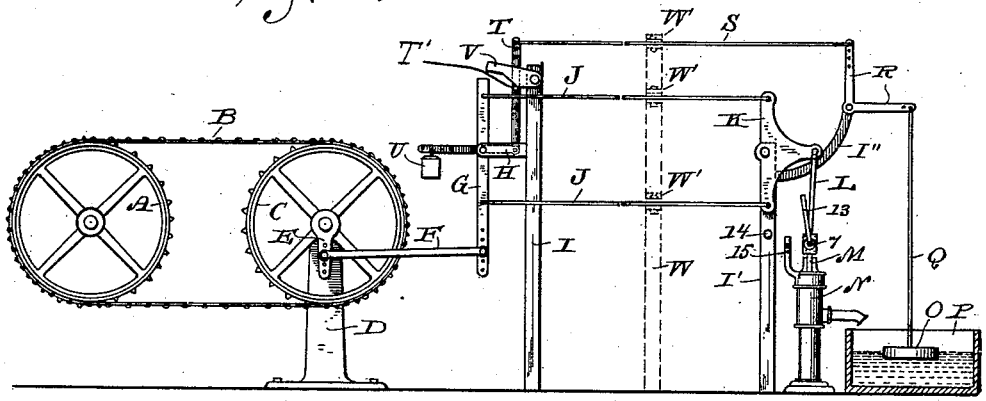
Figure 2:
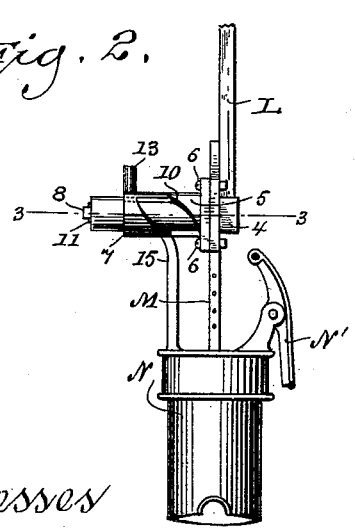
Figure 3:
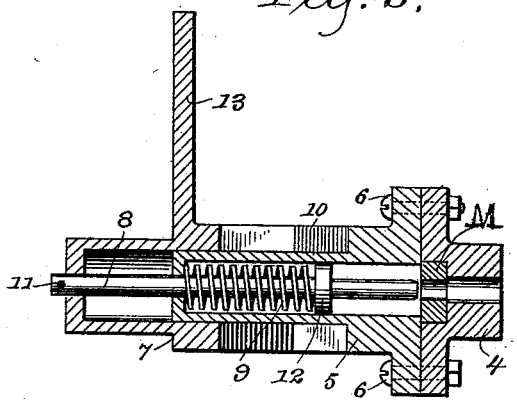

In the drawings, Figure 1, is an elevation of the complete device. Fig. 2, is a detail of the device for connecting the pump rod with the rod of the power transmitting mechanism. Fig. 3, is a central longitudinal section on line 3—3 of Fig. 2 of a device for automatically coupling the pump rod with the rod of the power transmitting mechanism.

A sprocket wheel A is fixed on the power transmitting shaft of the power supplying engine and a sprocket chain B running over the wheel A runs also on another sprocket wheel C which is supported on a frame or post D. The wheels A and C may be the same size the one as the other as shown in Fig. 1 or one may be larger than the other as will be most convenient in connection with the power used or for the purpose intended. A crank E is fixed on the axle of the wheel C and a rod F connects it to one arm of a tilting lever G. The rod F is connected to the crank E and the lever G at its respective ends by pins which may be inserted in any one of a series of apertures therefor in the crank E and in the lever G at different distances from their axes of motion whereby the relative motion communicated by the one to the other may be increased or diminished as desired. The lever G is medially pivoted on a rigid arm H affixed on the stationary frame or post I. Two parallel wires J J, connect the lever G to opposite arms of the double bell crank K which bell crank is pivoted on the stationary frame or post I'. The parallel connecting wires J, J, are attached to the lever G and to the bell crank K at points equidistant below and above their pivotal points respectively, whereby parallel motion is secured. A rod L connects the other arm of the bell crank K with the piston rod M of the pump N. It will be understood that by the mechanism just described by the rotation of the wheel A the piston rod M will be reciprocated in the manner usual for operating such pumps as are in common use.

In connection with the foregoing described power transmitting mechanism I provide means for automatically stopping the mechanism when the tank which is being supplied with water is full. That device consists of a float O adapted to be supported by the buoyancy of the water in the tank P which float is provided with a stem Q attached to one arm of a bell crank R which bell crank is pivoted on a bracket I'' rigid on the post I'; the other arm of the bell crank R being connected by a rod or wire S to one arm of a bell crank T which bell crank T is pivoted on the arm H and is provided with a weight U hung on the other arm of the bell crank, which weight is of such size and so adjusted on the arm of the bell crank as to tilt the arm of the bell crank downwardly and to correspondingly move the other mechanism thereto attached when the float O is buoyed up by the water but which float when the water is removed from beneath it is of sufficient weight to overcome the gravity of the weight U and tilt the thereto connected mechanism back into the position shown in Fig. 1. A latch V pivoted at one end on the post I rests medially on a pin T' fixed in the arm of the bell crank T which supports the latch in such position that its outer free end is above the end of the lever G but when the float O is raised by an additional supply of water in the tank P the weight U tilts the bell crank T whereby the latch V is permitted to drop in front of the lever G and lock it against oscillation. When the water is taken from the tank P by cattle drinking therefrom or otherwise the gravity of the float O will throw the pin T' against an incline on the underside of the latch V and will force it upwardly out of engagement with the lever G whereby the power transmitting mechanism is released and may work freely. The posts I and I' are frequently at considerable distance apart as the pump to be operated may be located a long distance from the buildings on the farm and sometimes it is necessary to change the direction of the parallel wires J, J, and connecting wire S in which case a post W indicated in Fig. 1 in dotted lines is provided with idle pulleys W' W' about which the wires J, J and S are carried at an angle.

The piston rod M is connected with the rod L so that it may be readily disconnected therefrom and connected to the handle N' whereby the pump may be operated by hand without reference to the power transmitting mechanism heretofore described, and as the pump is frequently located in a field at a distance from the power supply of the power transmitting mechanism I have provided the device shown in Figs. 2 and 3 for automatically coupling the piston rod M to the rod L. This device consists of a head 4 integral or rigid with the rod L an box 5 secured rigidly to the head 4 by means of the bolts 6, 6, a sleeve 7 supported on the box 5, a pin 8 and a spring 9. The box 5 is provided with an inclined peripheral shoulder 10 against which a corresponding inclined end of the sleeve 7 is adapted to bear. The pin 8 is thrust through the sleeve 7 and box 5 endwise and is held to longitudinal movement with the sleeve in one direction by a small pin 11 passing through the pin 8 outside of the sleeve 7 and in the other direction by the coiled spring 9, interposed between a collar 12 rigid on the pin and the outer end of the box 5. The coiled spring 9 is placed around the pin 8 in the aperture therefor in the box 5. The rod M, is inserted movably through the head, 4, and the head 4 and the rod M are provided with proper apertures for receiving the pin 8 therethrough whereby the rods L and M are coupled together.

The spring 9 is adapted to hold the pin 8 yieldingly up to its work and the pin is thrown out of engagement with the rod M by rotating the sleeve 7 which is conveniently done by the arm 13 rigid on the sleeve 7. When the pin 8 is thrown out of engagement with the rod M the arm 13 will be thrown down horizontally and a pin 14 is placed in the frame I' against which the arm 13 will strike and be tripped as the power transmitting mechanism is started whereby the rod M is automatically connected to the rod L. A bracket 15 rigid on the pump is adapted to trip the arm 13 the same as the pin 14 would do and either device may be used for that purpose.

It will be understood that I do not wish to confine myself to a pin encircled by a coiled spring, actuated by means of the registering inclined surfaces, as it is obvious that the pin, 8, may be actuated longitudinally for connecting and disconnecting rods L and M by any other suitable means, without departing from the spirit and scope of my invention.

What I claim as new, and desire to secure by Letters Patent of the United States, is—

1. In a power transmitting device the combination with a double crank K and connecting rods J, J, of a lever G pivoted medially and provided with a series of apertures in one arm, a rotating wheel C provided with a crank E having a series of apertures therein and a connecting rod F adapted to be connected with the lever G and the crank E through any of the series of apertures in the lever and crank whereby the extent of the motion communicated from the wheel C to the double crank K may be adjusted, substantially as described.

2. The combination with a pump rod L connected to a double crank K, connecting rods J, J, and tilting lever G of a latch V, a counterpoised bell crank T, a connecting rod S, a bell crank R, and a float O connected with one arm of the bell crank R, substantially as described.

3. The combination, with the tilting lever G of a power transmitting mechanism, a bell crank T provided with a weight U and pin T' connecting rod S, bell crank R, float O connected to the bell crank R, and latch V, substantially as described.

4. In a power transmitting mechanism a rod L provided with a head 4 in combination with a box 5, having an incline 10, a sleeve 7 having an inclined end and provided with an arm 13, a pin 8 provided with a pin 11 and a collar 12 a spring 9 and a tripping device 15, substantially as described.

5. In a power transmitting device, the combination, of transmitting mechanism, a vertically-reciprocating rod actuated thereby, said rod formed or provided with a head, a pump-rod entering the head, a spring-actuated pin adapted normally to automatically connect the pump-rod to the bracket, and means for throwing the same out of engagement, substantially as set forth.

In testimony whereof I affix my signature in presence of two witnesses.

JOHN H. WARD.

Witnesses:
L. B. CASWELL,
J. F. SCHRENER.